UNITED STATES PATENT OFFICE.

CARL BOSCH, ALWIN MITTASCH, AND CHRISTIAN SCHNEIDER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

HYDROGENIZATION AND DEHYDROGENIZATION OF CARBON COMPOUNDS.

1,216,933. Specification of Letters Patent. Patented Feb. 20, 1917.

No Drawing. Application filed June 4, 1914. Serial No. 842,957.

*To all whom it may concern:*

Be it known that we, CARL BOSCH, ALWIN MITTASCH, and CHRISTIAN SCHNEIDER, citizens of the German Empire, residing at Ludwigshafen-on-the-Rhine, Germany, have invented new and useful Improvements in the Hydrogenization and Dehydrogenization of Carbon Compounds, of which the following is a specification.

Our invention relates to the hydrogenization and dehydrogenization in the presence of a catalytic agent of compounds containing carbon, and to catalytic mixtures, by means of which the said hydrogenization and dehydrogenization can be carried out rapidly, with certainty, and at comparatively low temperatures.

We have discovered that these advantages can be obtained by employing as the catalytic agent, an intimate mixture of a common metal, in particular, nickel, cobalt, iron or copper, (hereinafter referred to as the catalytic metal) with a compound containing fluorin. Complex compounds of fluorin are particularly advantageous for the purposes of this invention.

In order to produce the contact mass while employing soluble compounds of fluorin, a solution of the said compound can be employed for soaking the metallic compound (for instance, nickel carbonate) from which the catalytic metal is to be produced, or it is sufficient merely to mix the said fluorin compound with, for instance, nickel nitrate. In those cases in which insoluble compounds of fluorin are to be employed, we prefer to precipitate the insoluble compound by bringing together suitable components in the presence of the metallic compound from which the catalytic metal is to be produced, for instance, the said complex fluorin compound can be precipitated in a solution or melt of nickel nitrate or onto solid nickel oxid. In many cases, however, simple mixing of the said bodies is sufficient. If desired, carriers for the catalytic agent may be employed. Both finely divided metal and also compact metal of the aforesaid kind, in particular iron, nickel, cobalt and copper, can be treated with fluorin compound chosen for the purpose of enhancing its catalytic activity. The catalytic mixtures according to this invention can be employed for the hydrogenization and dehydrogenization of compounds of very varied nature. The catalytic reaction can be carried out either at ordinary pressure or under increased pressure, for instance, above 50 atmospheres.

The following example will serve to illustrate further the nature of this invention, which, however, is not confined to this example. The parts are by weight:

Soak 100 parts of nickel carbonate in a concentrated solution of 10 parts of sodium silico-fluorid, then dry and treat with hydrogen at 320° C. Introduce the contact mass thus obtained into linseed oil, while avoiding the presence of air and treat with hydrogen at a temperature of 120° C. and a pressure of 10 atmospheres. The reduction, and simultaneously the hardening, of the oil take place very rapidly.

Instead of sodium silico-fluorid, other silico-fluorids can be employed, for instance those of aluminium, calcium, and potassium, or other fluorin compounds, such, for instance, as barium fluorid, calcium-boron fluorid, and potassium-titanium fluorid, can be used. Nickel wire netting can be similarly improved, for instance, by soaking it first with dilute nitric acid and then treating it with a solution of ammonium-silico-fluorid, then adding a small quantity of aluminium nitrate and drying and reducing.

Now what we claim is:—

1. A catalytic agent for use in the hydrogenization and dehydrogenization of compounds containing carbon, comprising an intimate mixture of a common metal acting as a catalyzer for the said reactions and a compound containing fluorin.

2. A catalytic agent for use in the hydrogenization and dehydrogenization of compounds containing carbon, comprising an intimate mixture of a metal of the iron group and a compound containing fluorin.

3. A catalytic agent for use in the hydrogenization and dehydrogenization of compounds containing carbon, comprising an intimate mixture of nickel and a compound containing fluorin.

4. A catalytic agent for use in the hydrogenization and dehydrogenization of compounds containing carbon, comprising an intimate mixture of nickel and a silico-fluorid.

In testimony whereof we have hereunto set our hands in the presence of two subscribing witnesses.

CARL BOSCH.
ALWIN MITTASCH.
CHRISTIAN SCHNEIDER.

Witnesses:
Ch. Beck,
J. Alec Lloyd.